United States Patent
Lattner et al.

(10) Patent No.: US 11,504,792 B2
(45) Date of Patent: Nov. 22, 2022

(54) METHOD AND DEVICE FOR WELDING BY MEANS OF A NON-CONSUMABLE ELECTRODE

(71) Applicant: Fronius International GmbH, Pettenbach (AT)

(72) Inventors: Peter Lattner, Pettenbach (AT); Josef Artelsmair, Pettenbach (AT)

(73) Assignee: Fronius International GmbH, Pettenbach (AT)

( * ) Notice: Subject to any disclaimer, the term of this patent is extended or adjusted under 35 U.S.C. 154(b) by 4 days.

(21) Appl. No.: 17/429,733

(22) PCT Filed: Nov. 20, 2020

(86) PCT No.: PCT/EP2020/082832
§ 371 (c)(1),
(2) Date: Aug. 10, 2021

(87) PCT Pub. No.: WO2021/099541
PCT Pub. Date: May 27, 2021

(65) Prior Publication Data
US 2022/0097160 A1    Mar. 31, 2022

(30) Foreign Application Priority Data
Nov. 21, 2019   (EP) .................................. 19210533

(51) Int. Cl.
*B23K 9/10*       (2006.01)
*B23K 9/095*      (2006.01)
*B23K 9/167*      (2006.01)

(52) U.S. Cl.
CPC .......... *B23K 9/1056* (2013.01); *B23K 9/0953* (2013.01); *B23K 9/167* (2013.01)

(58) Field of Classification Search
CPC .......... B23K 9/09; B23K 9/091; B23K 9/167; B23K 9/095; B23K 9/0953; B23K 9/1056
See application file for complete search history.

(56) References Cited

U.S. PATENT DOCUMENTS

| 7,091,446 B2 | 8/2006 | Houston et al. |
| 2014/0263242 A1 | 9/2014 | Peters et al. |

FOREIGN PATENT DOCUMENTS

| EP | 0 586 325 B1 | 6/1997 |
| EP | 2 431 119 B1 | 8/2016 |

(Continued)

OTHER PUBLICATIONS

International Search Report in PCT/EP2020/082832, dated Mar. 15, 2021.

(Continued)

*Primary Examiner* — Brian W Jennison
(74) *Attorney, Agent, or Firm* — Collard & Roe, P.C.

(57) ABSTRACT

The invention relates to a method and a device (1) for welding by means of a non-consumable electrode (2), wherein a welding current (I) alternating in polarity at a welding frequency ($f_S$) is applied by a current source (3) between the electrode (2) and a workpiece (4) in order to form an arc (5), and the polarity is changed back to the polarity before the polarity change if the voltage (U) is above the voltage threshold value ($U_{S+}$, $U_{S-}$) and the welding current (I) is below the current threshold value ($I_{S+}$, $I_{S-}$). According to the invention, the welding voltage (U) and the welding current (I) after a preset duration ($\Delta t$) after the polarity change are compared with the voltage threshold value ($U_{S+}$, $U_{S-}$) and the current threshold value ($I_{S+}$, $I_{S-}$), and in addition the power (P) in the arc (5) is determined, and the polarity is changed back if the welding voltage (U) is greater than the voltage threshold value ($U_{S+}$, $U_{S-}$), and/or if the welding current (I) is less than the current threshold (Continued)

Figure 1:
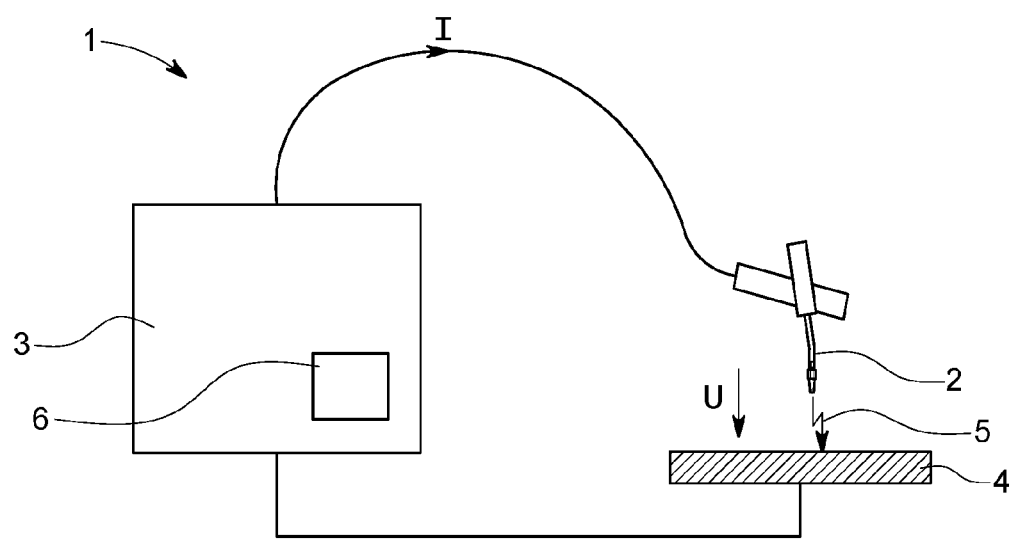

value ($I_{S+}$, $I_{S-}$), and/or the determined power (P) is less than a preset power threshold value ($P_S$).

9 Claims, 5 Drawing Sheets

(56) References Cited

FOREIGN PATENT DOCUMENTS

| JP | 2005193299 A | 7/2005 |
|----|--------------|--------|
| JP | 2012-000632 A | 1/2012 |
| JP | 3204946 U | 6/2016 |
| JP | 2019-025503 A | 2/2019 |
| JP | 2019058926 A | 4/2019 |

OTHER PUBLICATIONS

European Search Report in EP 19210533.6-1016, dated Jun. 19, 2020, with English translation of relevant parts.
Japanese Office Action in Japanese Application No. 2021-556869 with English Office Action Summary dated Jul. 12, 2022.

METHOD AND DEVICE FOR WELDING BY MEANS OF A NON-CONSUMABLE ELECTRODE

CROSS REFERENCE TO RELATED APPLICATIONS

This application is the National Stage of PCT/EP2020/082832 filed on Nov. 20, 2020, which claims priority under 35 U.S.C. § 119 of European Application No. 19210533.6 filed on Nov. 21, 2019, the disclosure of which is incorporated by reference. The international application under PCT article 21(2) was not published in English.

The invention relates to a method for welding by means of a non-consumable electrode, in particular a tungsten electrode, wherein a welding current alternating in polarity at a welding frequency is applied by a current source between the electrode and a workpiece in order to form an arc, and after a change in polarity the welding voltage and the welding current between the electrode and the workpiece are measured and the voltage is compared with a preset voltage threshold value and the welding current is compared with a preset current threshold value, and the polarity is changed back to the polarity before the polarity change if the voltage is above the voltage threshold value and the welding current is below the current threshold value.

Furthermore, the invention relates to a device for welding by means of a non-consumable electrode, in particular a tungsten electrode, having a current source for applying a welding current alternating in polarity at a welding frequency between the electrode and a workpiece to form an arc, and having a control device which is designed to measure the welding voltage between the non-consumable electrode and the workpiece and the welding current after the change in polarity and to compare the measured voltage with a preset voltage threshold value and the measured welding current with a preset current threshold value.

When welding with a non-consumable electrode, especially in TIG (tungsten inert-gas) welding with a tungsten electrode, the arc burns between the end of the non-consumable electrode and the workpiece. The additive material in the form of wires or rods is held in the arc and melted. In principle, the welding process can be performed with a non-consumable electrode using both direct current and alternating current. For workpieces made of materials that tend to form an oxide layer, for example aluminium or magnesium, alternating current, i.e. a welding current with alternating polarity, is mainly used. During the positive polarity, i.e. a plus polarity of the non-consumable electrode relative to the workpiece, the oxide layer can be broken open, whereas during the negative polarity heat energy is introduced into the workpiece and thus the welding is performed. Accordingly, the duration of the positive polarity, i.e. the positive welding current time, is usually chosen to be less than the duration of the negative polarity, i.e. the negative welding current time.

In principle, the present invention is also applicable to welding with a consumable electrode, wherein the polarity of the welding current is changed. For example, in MIG (metal inert-gas) welding of aluminium the polarity of the welding current is changed during the arc phase.

For example, patent EP 2 431 119 B1 describes such an alternating current welding method and an alternating current welding device.

If it is not possible to ignite an arc during the polarity reversal process from positive to negative polarity or from negative to positive polarity, the machinability of the surface of the workpiece can be severely compromised. In addition, the hot melt bath would cool down, which means that a stable welding process is no longer possible.

Normally, the welding voltage and/or the welding current is monitored after a change of polarity. Too high a welding voltage or too low a welding current is an indication that the arc could not be ignited after the polarity change. In such a case, the polarity is changed back or reversed to the previous polarity.

For example, EP 0 586 325 B1 and EP 2 431 119 B1, already mentioned above, describe a welding method of the relevant kind with such a polarity reversal if the arc is not successfully re-ignited.

The disadvantage of known welding processes with such a facility for polarity reversal is that due to the welding circuit inductances, delays occur in the breakdown of the welding voltage or the increase in the welding current, which represent the reverse polarity conditions, and incorrect values of the welding voltage and the welding current are applied. Thus, a polarity reversal occurs although the arc would have ignited after a delay. This causes instabilities during the welding process, which in turn can result in quality deficits (lack of cleaning of the surface of the workpiece or reduced energy input into the workpiece) in the welded joint.

The object of the present invention is to create an above-mentioned method and an above-mentioned device for welding by means of a non-consumable electrode, which operates with greater stability due to a more reliable polarity reversal in the event of a failure of re-ignition of the arc, resulting in a higher weld quality. The method according to the invention and the device according to the invention are designed to be as simple and cost-effective as possible to implement. Disadvantages of known methods and devices should be avoided or at least be reduced.

The object according to the invention is achieved with regard to the method by the fact that the welding voltage and the welding current after a preset duration following a change in the polarity are compared with the voltage threshold value and the current threshold value, and the power in the arc is additionally determined, and the polarity is changed back to the polarity before the change of polarity if the welding voltage is greater than the voltage threshold value, and/or if the welding current is less than the current threshold value and/or the determined power is less than the preset power threshold value. By applying the delay time according to the invention until the measured welding voltage and the measured welding current are compared with the voltage threshold value and the current threshold value, the effects and delays described above due to the inductances can be eliminated and reliable results can be obtained for the decision to reverse the polarity. Normally, the welding voltage and the welding current are measured continuously. In the present method it is important that the measured values after expiry of the preset duration after the polarity change are used for the comparison with the voltage threshold value and the current threshold value. In addition to waiting for the preset duration for the comparison of the measured values with the threshold values, a third condition for the polarity reversal can be applied, namely the query as to whether the power in the arc has reached a preset power threshold value. This allows an even more reliable statement to be made as to whether or not the arc has been successfully re-ignited. If the arc could not be ignited, the polarity is changed back to the previous polarity instead of being changed to the other polarity. The result is a more stable welding process and also a higher weld quality. The method can be implemented relatively simply and cost-effectively by implementing the provided method steps in a control device of the welding device that is usually present. This is usually carried out by software in a corresponding microprocessor or microcontroller. Depending on the polarity, the voltage threshold values and current threshold values are positive or negative. Theoretically, the magnitudes of the respective positive voltage threshold value and positive current threshold value can be different from those of the negative voltage threshold and negative current threshold. These threshold values, as well as the power threshold value and the preset duration, are determined empirically and stored in a corresponding memory or database. The preset duration for the change from positive polarity to negative polarity can also theoretically be chosen differently from the preset duration for the change from negative polarity to positive polarity. In principle, it is left open whether the polarity reversal conditions are only applied when switching from positive polarity to negative polarity or from negative polarity to positive polarity, and whether the polarity reversal condition is activated on each of these polarity changes.

Preferably, after each change in the polarity of the welding current from positive polarity to negative polarity, the welding voltage and the welding current after the preset duration following the polarity change are compared with the voltage threshold value and the current threshold value, and in addition the power in the arc is determined, and the polarity is changed back to the positive polarity if the welding voltage is greater than the preset voltage threshold value, and/or if the welding current is less than the current threshold value, and/or the determined power is less than the preset power threshold value. It is entirely practical to apply the conditions for the eventual polarity reversal at each of these polarity changes.

Alternatively, or in addition, after each change in the polarity of the welding current from positive polarity to negative polarity, the welding voltage and the welding current after the preset duration following the polarity change can be compared with the voltage threshold value and the current threshold value, and in addition the power in the arc can be determined and the polarity changed back to the positive polarity if the welding voltage is greater than the preset voltage threshold value, and/or if the welding current is less than the current threshold value, and/or the determined power is less than the preset power threshold value. Ideally, for all polarity changes, the conditions for polarity reversal are tested and if at least one of the conditions is met, the polarity reversal is carried out.

Ideally, a duration from 5 μs to 500 ms is preset. These are suitable values for the preset duration for typical inductances of the welding system, which if complied with will result in more reliable results.

According to a further feature of the invention the power in the arc is determined from the product of the welding voltage and the welding current. This is a simple calculation method based on the existing values of the welding voltage and the welding current.

Ideally, as one of the conditions for the polarity reversal the determined power in the arc is compared with a preset power threshold value from 3 W to 3000 W. This range of values is a suitable indicator for the ignition of the arc in the case of common welding processes using non-consumable electrodes, in particular TIG welding methods.

The welding current is changed with a welding frequency from 30 Hz to 2000 Hz. These values are particularly suitable for implementing welding methods with a non-consumable electrode. Accordingly, the period is between 500 μs and 33 ms.

The welding current advantageously is alternated between a time of positive polarity which is 30% to 40% of the period, and a time of negative polarity, which is equal to 60% to 70% of the period. As mentioned above, the time of the positive polarity which is used to break open the oxide layer of the workpiece is chosen to be shorter than the time of the negative polarity during which the energy or heat is input into the workpiece. The specified ranges represent advantageous values for these times.

The object according to the invention is also achieved by a device as mentioned above for welding with a non-consumable electrode, wherein the control device is designed to carry out the method described above. For details of advantages achievable as a result, reference is made to the above description of the method. The device according to the invention is relatively simple and inexpensive to implement. Normally, such welding devices already have capabilities for measuring the voltage and the current and a corresponding control device, which must then be adapted according to the method described above. This is usually implemented in software.

Figure 2:
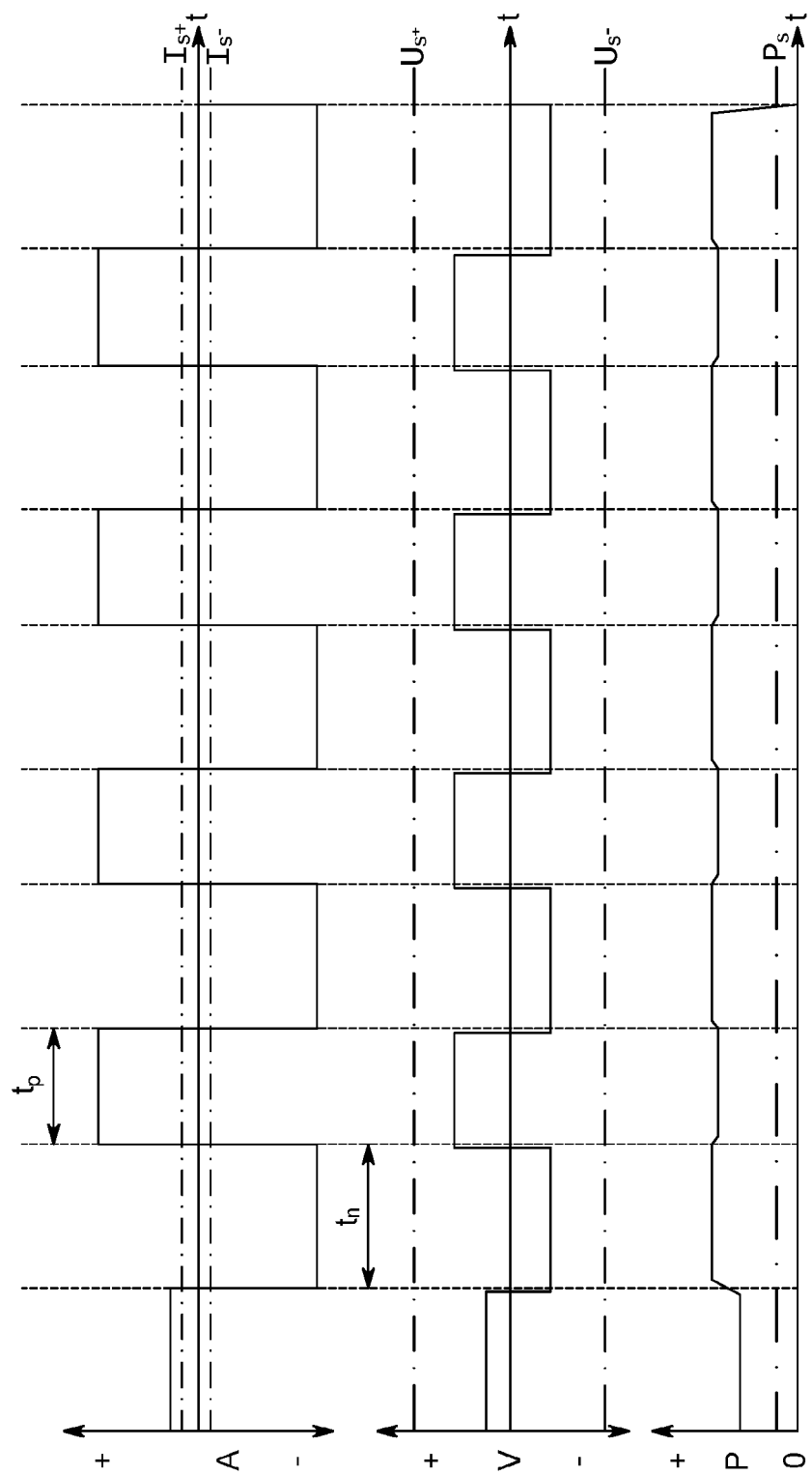
Figure 3:
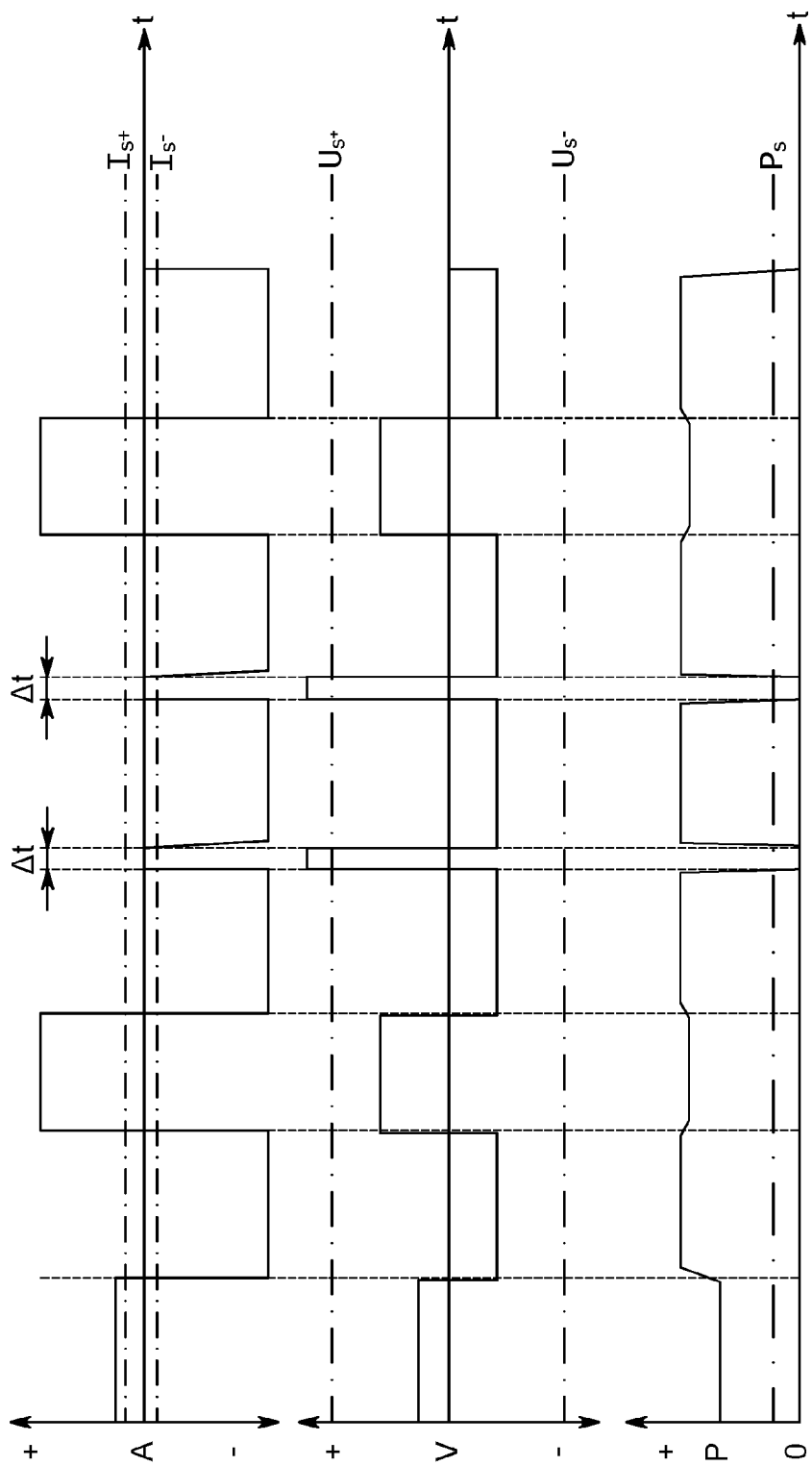
Figure 4:
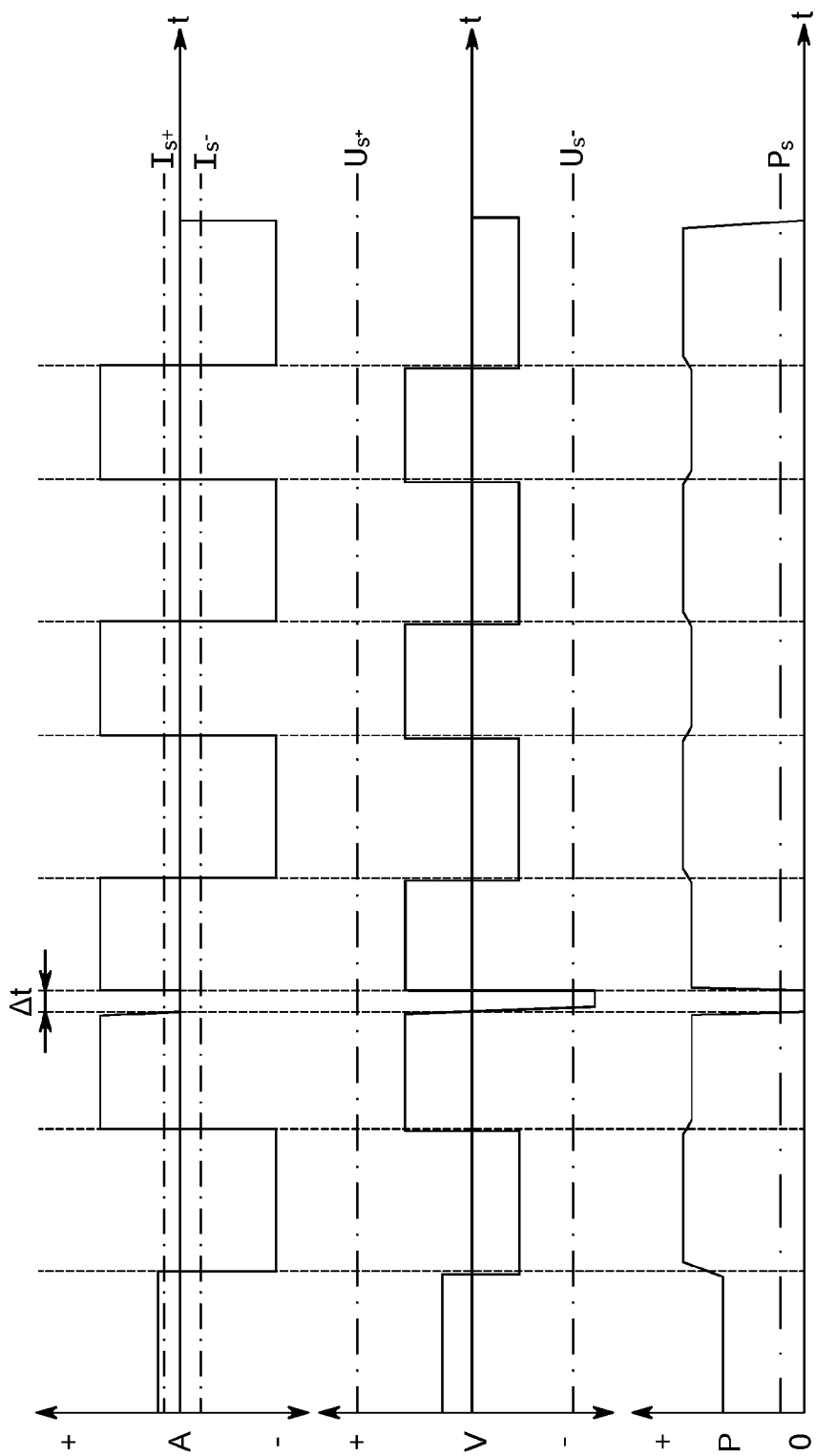
Figure 5:
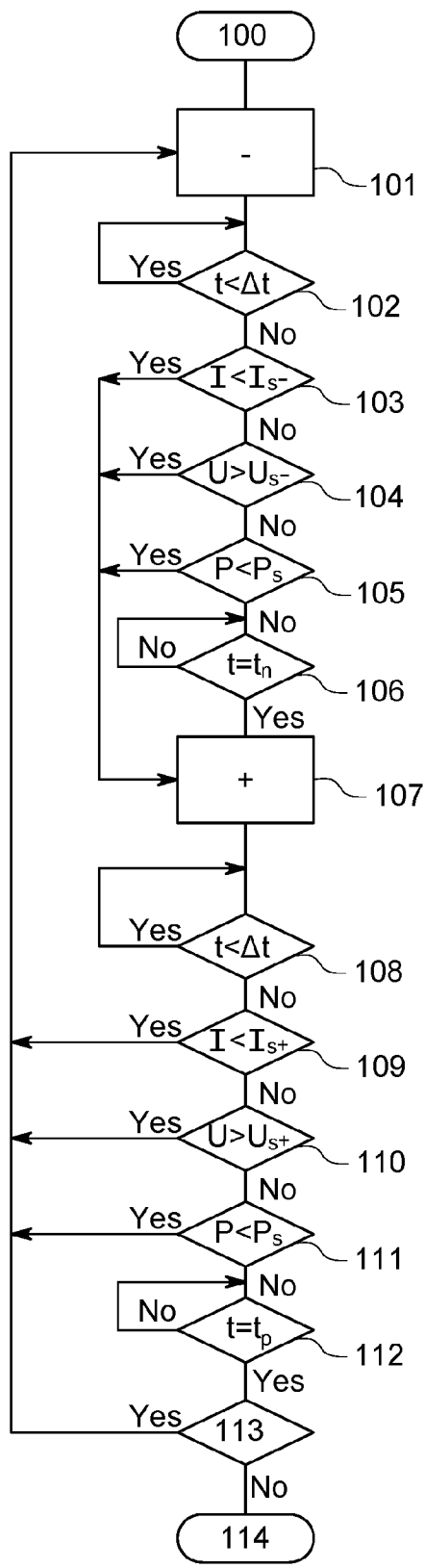

The present invention will be explained in further detail by reference to the attached drawings. Shown are:

FIG. 1 a schematic block diagram of a device for welding by means of a non-consumable electrode;

FIG. 2 the temporal waveforms of the welding voltage, the welding current and the power in the arc during normal operation of a device for welding by means of a non-consumable electrode;

FIG. 3 the temporal waveforms of the welding voltage, the welding current and the power in the arc at the onset of a polarity reversal according to the invention to the negative polarity;

FIG. 4 the temporal waveforms of the welding voltage, the welding current and the power in the arc at the onset of a polarity reversal according to the invention to the positive polarity; and FIG. 5 a flowchart illustrating the method according to the invention for welding with a non-consumable electrode.

FIG. 1 shows a schematic block diagram of a device 1 for welding by means of a non-consumable electrode 2, in particular a device 1 for TIG (tungsten inert-gas) welding with a tungsten electrode. A current source 3 is connected to both the non-consumable electrode 2 and the workpiece 4 made of electrically conductive material. The current source 3 applies a welding current I that alternates in polarity with a welding frequency $f_s$ between the non-consumable electrode 2 and the workpiece 4. This causes an arc 5 between the end of the non-consumable electrode 2 and the workpiece 4 to be ignited both in the positive polarity + phase and in the negative polarity − phase. A control device 6, which is usually located in the current source 3, is used to control the timing sequences and control the respective values of the welding current I and the welding voltage U. In addition, the control device 6 is designed to measure the welding voltage U between the non-consumable electrode 2 and the workpiece 4 and to measure the welding current I after the change in polarity.

FIG. 2 shows the temporal waveforms of the welding voltage U, the welding current I, and the power P in the arc during normal operation of a device 1 for welding by means of a non-consumable electrode 2. After a start phase, the welding current I is applied with negative polarity − with a specific negative welding current. At the end of the time $t_n$ of the negative polarity −, the polarity is changed to the positive polarity +. When the time $t_p$ of the positive polarity + has elapsed, the polarity is changed again. In contrast to the practice, here the times $t_n$ of the negative polarity − and the times $t_p$ of the positive polarity are essentially equal in length. The resulting welding voltage U as a function of the time t is shown in the second diagram. In the third time diagram, the power P in the arc 5 is shown as a function of the time t. According to the invention, voltage threshold values $U_{S−}$ and $U_{S+}$ and current threshold values $I_{S−}$ and $I_{S+}$ are defined for the negative polarity − and the positive polarity +, with which the measured values of the welding voltage U and the welding current I are compared, as conditions on whether a polarity reversal should take place. According to the invention, a power threshold value $P_S$ is also introduced, with which the power P in the arc 5, either measured or determined from the welding voltage U and the welding current I, is compared as a further condition on reversing the polarity. FIG. 2 shows the case in which in either case or with either polarity a reignition of the arc 5 occurs and thus no polarity reversal is necessary, but the polarity is always changed to the next polarity at the specified times.

FIG. 3 shows the temporal waveforms of the welding voltage U, the welding current I and the power P in the arc at the onset of a polarity reversal according to the invention to the negative polarity −. During the change in polarity from the negative polarity − to the positive polarity + the preset duration Δt is allowed to elapse and the conditions $U>U_{S+}$      1.

$I<I_{S+}$      2.

$P<P_S$      3.

are tested. If at least one of these conditions is met, this is an indication of a failure of the ignition of the arc, and therefore the polarity is changed back to the previous polarity, in the example shown, the negative polarity −. In the exemplary embodiment shown, at the second and third polarity change from negative polarity − to positive polarity + the polarity of the welding current I is changed back again to the negative polarity − each time. After one or two polarity reversals, it is finally possible to break open the oxide layer of the workpiece so that the arc can be reignited. In this case, the polarity is changed to the next polarity again as normal. If it has not been possible to break open the oxide layer, then very long phases of the negative polarity − can result.

FIG. 4 shows the temporal waveforms of the welding voltage U, the welding current I, and the power P in the arc at the onset of a polarity reversal according to the invention to the positive polarity +. In this case, the preset duration Δt is allowed to elapse when reversing the polarity from positive polarity + to negative polarity − and the conditions $U>U_{S−}$      1.

$I<I_{S−}$      2.

$P<P_S$      3.

are tested. If at least one of these conditions is met, this is an indication of a failure of the ignition of the arc and the polarity is therefore changed back to the previous polarity, in the example shown, the positive polarity +. In the exemplary embodiment shown, at the first polarity change from positive polarity + to negative polarity − the polarity of the welding current I is changed back again to the positive polarity +. After a polarity reversal, the arc is finally successfully re-ignited during the positive polarity +. Therefore, the polarity is then changed to the next polarity again as normal. If no oxide layer is formed, this can also result in long phases of positive polarity.

Finally, FIG. 5 shows a flowchart to illustrate the method according to the invention for welding with a non-consumable electrode. At block 100, the method for welding with a non-consumable electrode is started. After the start, a welding current I with negative polarity − is applied (block 101), whereupon the preset duration Δt is allowed to elapse (block 102) before the measured values of the welding current I are compared with the preset current threshold value $I_{S−}$ (block 103). If the welding current I is less than this preset current threshold value $I_{S−}$, the polarity is changed back to the positive polarity + by jumping to block 107. If the welding current I is greater than or equal to the preset current threshold value $I_{S−}$, processing continues with query 104. Here, the welding voltage U is compared with the preset voltage threshold value $U_{S−}$. If the welding voltage U is greater than this preset voltage threshold $U_{S−}$, the polarity is changed back to the positive polarity + by jumping to block 107. If the welding voltage U is less than or equal to the preset voltage threshold value $U_{S−}$, processing continues with query 105. Here, for example, the power P is determined from the welding voltage U and the welding current I and compared with the preset power threshold value $P_S$. If the power P is less than this preset power threshold value $P_S$, the polarity is changed back to the positive polarity + by jumping to block 107. If the power P is greater than or equal to the preset power threshold value $P_S$, the time $t_n$ of the negative polarity − is allowed to elapse (block 106) and then the polarity is changed to the positive polarity + (block 107).

After the polarity change to the positive polarity +, the preset duration Δt (which can theoretically differ from the preset duration Δt when changing to the negative polarity − according to query 102) is allowed to elapse (block 108) before the measured values of the welding current I are compared with the preset current threshold value $I_{S+}$ (block 109). If the welding current I is less than this preset current threshold value $I_{S+}$, the polarity is changed back to the negative polarity − by jumping to block 101. If the welding current I is greater than or equal to the preset current threshold value $I_{S+}$, processing continues with query 110. Here, the welding voltage U is compared with the preset voltage threshold value $U_{S+}$. If the welding voltage U is greater than this preset voltage threshold $U_{S+}$, the polarity is changed back to the negative polarity − by jumping to block 101. If the welding voltage U is less than or equal to the preset voltage threshold value $U_{S+}$, processing continues with query 111. Here the power P is compared with the preset power threshold value $P_S$. If the power P is less than this preset power threshold value $P_S$, the polarity is changed back to the negative polarity − by jumping to block 101. If the power P is greater than or equal to the preset power threshold value $P_S$, the time $t_p$ of the negative polarity − is allowed to elapse (block 112) and then processing proceeds to the query to determine whether the method should be continued (block 113). If appropriate, the polarity is changed to the negative polarity − by returning to block 101. If the method is to be terminated according to query 113, the sequence is terminated (block 114).

The flowchart according to FIG. 5 is intended to illustrate a variant of the method according to the invention. Of course, the comparisons of the measured values with the threshold values (blocks 103, 104, 105 or 109, 110, 111) can be carried out in any order. The flow diagram illustrated shows the comparisons of the measured values with the threshold values in the form of logical "Or" operations. Other operations for the comparisons according to the blocks 103, 104, 105 or 109, 110, 111 in the form of logical "And" or "And/Or" operations would also be possible.

The invention claimed is:

1. A method for welding by means of a non-consumable electrode (2), in particular a tungsten electrode, wherein a welding current (I) alternating in polarity at a welding frequency ($f_S$) is applied by a current source (3) between the electrode (2) and a workpiece (4) in order to form an arc (5), and after a change in polarity the welding voltage (U) and the welding current (I) between the electrode (2) and the workpiece (4) are measured and the voltage (U) is compared with a preset voltage threshold value ($U_{S+}$, $U_{S-}$) and the welding current (I) is compared with a preset current threshold value ($I_{S+}$, $I_{S-}$) and the polarity is changed back to the polarity before the polarity change if the voltage (U) is above the voltage threshold value ($U_{S+}$, $U_{S-}$) and the welding current (I) is below the current threshold value ($I_{S+}$, $I_{S-}$), wherein the welding voltage (U) and the welding current (I) after a preset duration ($\Delta t$) after the polarity change are compared with the voltage threshold value ($U_{S+}$, $U_{S-}$) and the current threshold value ($I_{S+}$, $I_{S-}$), and in addition the power (P) in the arc (5) is determined, and the polarity is changed back to the polarity before the polarity change if the welding voltage (U) is greater than the voltage threshold value ($U_{S+}$, $U_{S-}$), and/or if the welding current (I) is less than the current threshold value ($I_{S+}$, $I_{S-}$), and/or the determined power (P) is less than a preset power threshold value ($P_S$).

2. The method according to claim 1, wherein after each change in the polarity of the welding current (I) from negative polarity (−) to positive polarity (+), the welding voltage (U) and the welding current (I) after the preset duration ($\Delta t$) after the polarity change are compared with the voltage threshold value ($U_{S+}$) and the current threshold value ($I_{S+}$), and in addition the power (P) in the arc (5) is determined, and the polarity is changed back to the negative polarity (−) if the welding voltage (U) is greater than the preset voltage threshold value ($U_{S+}$), and/or the welding current (I) is less than the current threshold value ($I_{S+}$), and/or the determined power (P) is less than the preset power threshold value ($P_S$).

3. The method according to claim 1, wherein after each change in the polarity of the welding current (I) from positive polarity (+) to negative polarity (−), the welding voltage (U) and the welding current (I) after the preset duration ($\Delta t$) after the polarity change are compared with the voltage threshold value ($U_{S-}$) and the current threshold value ($I_{S-}$), and in addition the power (P) in the arc (5) is determined, and the polarity is changed back to the positive polarity (+) if the welding voltage (U) is greater than the preset voltage threshold value ($U_{S-}$), and/or if the welding current (I) is less than the current threshold value ($I_{S-}$), and/or the determined power (P) is less than the preset power threshold value ($P_S$).

4. The method according to claim 1, wherein a duration ($\Delta t$) from 5 μs to 500 ms is preset.

5. The method according to claim 1, wherein the power (P) in the arc (5) is determined from the product of the welding voltage (U) and the welding current (I).

6. The method according to claim 1, wherein the measured power (P) in the arc (5) is compared with a preset power threshold value ($P_S$) of 3 W to 3000 W.

7. The method according to claim 1, wherein the welding current (I) is changed with a welding frequency ($f_S$) from 30 Hz to 2000 Hz.

8. The method according to claim 1, wherein the welding current (I) is alternated between a time ($t_p$) of the positive polarity which is 30% to 40% of the period (T), and a time ($t_n$) of the negative polarity which is equal to 60% to 70% of the period (T).

9. A device (1) for welding by means of a non-consumable electrode (2), in particular a tungsten electrode, having a current source (3) for applying a welding current (I) alternating in polarity at a welding frequency ($f_S$) between the electrode (2) and a workpiece (4) to form an arc (5), and having a control device (6) which is designed to measure the welding voltage (U) between the non-consumable electrode (2) and the workpiece (4) and the welding current (I) after the change in polarity and to compare the measured voltage (U) with a preset voltage threshold value ($U_{S+}$, $U_{S-}$) and the measured welding current (I) with a preset current threshold value ($I_{S+}$, $I_{S-}$), wherein the control device (6) is designed for carrying out a method for welding by means of the non-consumable electrode (2), in particular the tungsten electrode, wherein the welding current (I) alternating in polarity at the welding frequency ($f_S$) is applied by the current source (3) between the electrode (2) and the workpiece (4) in order to form the arc (5), and after a change in polarity the welding voltage (U) and the welding current (I) between the electrode (2) and the workpiece (4) are measured and the voltage (U) is compared with a preset voltage threshold value ($U_{S+}$, $U_{S-}$) and the welding current (I) is compared with the preset current threshold value ($I_{S+}$, $I_{S-}$) and the polarity is changed back to the polarity before the polarity change if the voltage (U) is above the voltage threshold value ($U_{S+}$, $U_{S-}$) and the welding current (I) is below the current threshold value ($I_{S+}$, $I_{S-}$), wherein the welding voltage (U) and the welding current (I) after a preset duration ($\Delta t$) after the polarity change are compared with the voltage threshold value ($U_{S+}$, $U_{S-}$) and the current threshold value ($I_{S+}$, $I_{S-}$), and in addition the power (P) in the arc (5) is determined, and the polarity is changed back to the polarity before the polarity change if the welding voltage (U) is greater than the voltage threshold value ($U_{S+}$, $U_{S-}$), and/or if the welding current (I) is less than the current threshold value ($I_{S+}$, $I_{S-}$), and/or the determined power (P) is less than a preset power threshold value ($P_S$).

* * * * *